(12) United States Patent
Drzymala et al.

(10) Patent No.: US 8,002,184 B1
(45) Date of Patent: Aug. 23, 2011

(54) BI-OPTICAL IMAGING POINT-OF-TRANSACTION WORKSTATION WITH RECESSED UPRIGHT WINDOW

(75) Inventors: Mark Drzymala, Commack, NY (US);
Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 12/855,115

(22) Filed: Aug. 12, 2010

(51) Int. Cl.
*G06K 7/10* (2006.01)

(52) U.S. Cl. .............. 235/454; 235/462.41; 235/462.42; 235/380

(58) Field of Classification Search .................. 235/454, 235/462.41, 462.42, 380
See application file for complete search history.

(56) References Cited

U.S. PATENT DOCUMENTS

| | | |
|---|---|---|
| 4,613,895 A | 9/1986 | Burkey et al. |
| 4,794,239 A | 12/1988 | Allais |
| 5,059,779 A | 10/1991 | Krichever et al. |
| 5,124,539 A | 6/1992 | Krichever et al. |
| 5,200,599 A | 4/1993 | Krichever et al. |
| 5,304,786 A | 4/1994 | Pavlidis et al. |
| 5,703,349 A | 12/1997 | Meyerson et al. |
| 6,644,547 B1 | 11/2003 | White |
| 7,051,922 B2 | 5/2006 | Check et al. |
| 7,191,947 B2 | 3/2007 | Kahn et al. |
| 7,246,747 B2 | 7/2007 | Bremer et al. |
| 7,401,732 B2 * | 7/2008 | Haddad ................... 235/380 |
| 7,748,631 B2 | 7/2010 | Patel et al. |
| 2007/0119934 A1 * | 5/2007 | Ohkawa et al. ............ 235/454 |
| 2008/0296387 A1 * | 12/2008 | Sanders et al. .......... 235/462.41 |
| 2009/0101719 A1 * | 4/2009 | Knowles et al. ......... 235/462.42 |

* cited by examiner

*Primary Examiner* — Allyson N Trail

(57) ABSTRACT

A bi-optical workstation has dual windows and an imaging reader for electro-optically reading indicia on targets to be processed at the workstation through at least one of the windows. An upright window of the workstation is protected from scratching and/or contamination by deeply recessing the upright window in a raised housing portion of the workstation, and by spacing the upright window away from a front wall of the raised housing portion by a spacing exceeding one-half of an inch. A pair of protection bars is advantageously exteriorly mounted on the upright window and located in the spacing to block contact of the targets with the upright window.

17 Claims, 2 Drawing Sheets

BI-OPTICAL IMAGING POINT-OF-TRANSACTION WORKSTATION WITH RECESSED UPRIGHT WINDOW

BACKGROUND OF THE INVENTION

In the retail industry, flat bed, laser-based readers, also known as horizontal slot scanners, have been used to electro-optically read one-dimensional bar code symbols, particularly of the Universal Product Code (UPC) type, at point-of-transaction checkout systems in supermarkets, warehouse clubs, department stores, and other kinds of retailers for many years. As exemplified by U.S. Pat. No. 5,059,779; No. 5,124,539 and No. 5,200,599, a single, horizontal window is set flush with, and built into, a horizontal countertop of the system. Products to be purchased bear identifying symbols and are typically slid by a clerk across the horizontal window through which a multitude of scan lines is projected in a generally upwards direction. When at least one of the scan lines sweeps over a symbol associated with a product, the symbol is processed and read. The multitude of scan lines is typically generated by a scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the horizontal window as a scan pattern of the scan lines.

It is also known to provide a checkout system not only with a generally horizontal window, but also with an upright or generally vertical window that faces the clerk at the system. The upright window is oriented generally perpendicularly to the horizontal window, or is slightly rearwardly or forwardly inclined. The laser scan pattern generator within this dual window or bi-optical terminal or workstation also projects the multitude of scan lines in a generally outward direction through the upright window toward the clerk. The generator for the upright window can be the same as, or different from, the generator for the horizontal window. The clerk slides the products past either window, e.g., from right to left, or from left to right, or diagonally, in a "swipe" mode. Alternatively, the clerk merely presents the symbol on the product to a central region of either window in a "presentation" mode. The choice depends on clerk preference or on the layout of the system.

Sometimes, the upright window is not built into the system as a permanent installation. Instead, a vertical slot scanner is configured as a portable reader that is placed on the countertop of an existing horizontal slot scanner in a hands-free mode of operation. In the frequent event that large, heavy, or bulky products, which cannot easily be brought to the reader, have symbols that are required to be read, then the clerk may also manually grasp the portable reader and lift it off, and remove it from, the countertop for reading the symbols in a handheld mode of operation.

As advantageous as these laser-based, point-of-transaction systems have been in processing transactions involving products associated with one-dimensional symbols, each having a row of bars and spaces spaced apart along one direction, these systems cannot process stacked symbols, such as Code 49 that introduced the concept of vertically stacking a plurality of rows of bar and space patterns in a single symbol, as described in U.S. Pat. No. 4,794,239, or two-dimensional symbols, such as PDF417 that increased the amount of data that could be represented or stored on a given amount of surface area, as described in U.S. Pat. No. 5,304,786. Both one- and two-dimensional symbols, as well as stacked symbols, can be read by employing imaging readers each having a solid-state imager which has a one- or two-dimensional array of cells or photosensors that correspond to image elements or pixels in a field of view of the imager. Such an imager may include a one- or two-dimensional charge coupled device (CCD) or a complementary metal oxide semiconductor (CMOS) device, as well as associated circuits for producing electronic signals corresponding to the one- or two-dimensional array of pixel information over the field of view.

It is therefore known to use a solid-state imager for capturing a monochrome image of a symbol as, for example, disclosed in U.S. Pat. No. 5,703,349. It is also known to use a solid-state imager with multiple buried channels for capturing a full color image of a symbol as, for example, disclosed in U.S. Pat. No. 4,613,895. It is common to provide a two-dimensional CCD with a 640×480 resolution commonly found in VGA monitors, although other resolution sizes are possible.

It is also known to install the solid-state imager, analogous to that conventionally used in a consumer digital camera, in a bi-optical, dual window, point-of-transaction workstation, as disclosed in U.S. Pat. No. 7,191,947, in which the dual use of both the solid-state imager and the laser scan pattern generator in the same workstation is disclosed. The workstation is typically either mounted on the countertop, or is seated into a well formed in the countertop. The horizontal and upright windows are typically set flush with, and built into, the workstation. It is possible to replace all of the laser scan pattern generators with solid-state imagers in order to improve reliability and to enable the reading of two-dimensional and stacked symbols, as well as the imaging of other non-symbols or targets, such as signatures, driver's licenses, receipts, etc. It is also known, for example, as disclosed in U.S. Pat. No. 7,748,631, to arrange a plurality of stationary field minors within the workstation to capture return light from the symbol through either the horizontal and/or the upright window over intersecting fields of view. The captured return light is successively reflected onto the stationary field mirrors for reflection therefrom to at least one solid-state imager.

As advantageous as the known imager-based, bi-optical workstation has been in processing products, the flush-mounted, upright window tends to get scratched by products scraping the upright window and/or contaminated by dirt, dust, finger oil, food particles and like contaminants that are deposited during normal use in either the swipe and/or presentation modes of operation. Such scratching often occurs by inattentive clerks. Such contamination is inevitable, especially in retail and warehouse environments. Depending on their extent, such scratching and contamination eventually obscure the return light and degrade reading performance. Hence, the flush-mounted, upright window requires frequent cleaning and, in extreme cases, the heavily scratched window requires repair and replacement. Cleaning of a contaminated window, however, may not be regularly or adequately performed. Repair and replacement of a scratched window puts the workstation out of service.

To attempt to alleviate such window scratching and contamination, it is known to slightly recess the upright window in the workstation. However, such recessing is marginal, that is, on the order of three-tenths of an inch and less. Even so, many products passed by the marginally recessed upright window often scrape the upright window, especially when the products are in bags or like yieldable containers that project into such marginal recess as they are swiped past the upright window during check-out.

Accordingly, a solution is needed that eliminates the inconvenience and minimizes the expense of cleaning, repairing and replacing the upright window of the bi-optical workstation. A means of protecting the upright window is thus needed.

SUMMARY OF THE INVENTION

This invention generally relates to a bi-optical workstation for processing targets bearing or associated with indicia, typically one- or two-dimensional bar code symbols or non-symbols, and to a method of protecting an upright window of the bi-optical workstation from scratching and/or contamination during workstation operation. The indicia can be symbols printed on products to be checked out at the workstation, or can be symbols displayed on screens of cellular telephones, or can be symbols printed on drivers' licenses, or can be non-symbols associated with a target to be processed. A non-symbol can be a paper receipt, a person's likeness, or a signature, any of which might be imaged in connection with verification of a product transaction at the workstation.

The bi-optical workstation has dual windows, typically a generally horizontal window supported by a generally horizontal housing portion, and a generally upright window supported by a raised housing portion extending upwardly away from the horizontal housing portion. The workstation includes at least one imaging reader, and preferably a plurality of imaging readers, each supported by the housing and operative by image capture for electro-optically reading the indicia by capturing and processing return light returning from the indicia. The windows bound a reading zone in which the indicia are read.

Each imaging reader includes a solid-state imager for capturing return light from the indicia through at least one of the windows. Each imager preferably comprises a one- or two-dimensional, charge coupled device (CCD) array or a complementary metal oxide semiconductor (CMOS) array. Each imager includes an illuminator for illuminating the indicia with illumination light from one or more illumination light sources, e.g., one or more light emitting diodes (LEDs). A controller, e.g., a microprocessor, is operative for controlling each illuminator to illuminate the indicia, for controlling each imager to capture the illumination light returning from the indicia over an exposure time period to produce electrical signals indicative of the indicia being read, and for processing the electrical signals to read the indicia. Each illuminator is only operative during the exposure time period. Each imager is controlled to capture the light from the indicia during different exposure time periods to avoid mutual interference among the illuminators.

One feature of this invention resides, briefly stated, in protecting the upright window through which the return light passes from scratches and/or contamination, as described above. The upright window is supported by, and deeply recessed in, the raised housing portion. The upright window is at least partly surrounded by a front wall of the raised hosing portion and is spaced away from the front wall by a spacing exceeding one-half of an inch, preferably on the order of one inch. The front wall lies in an imaging plane, and the imaging reader captures the return light when the indicia is located in the vicinity of the imaging plane of the front wall. Stationary field minors are preferably mounted within the raised housing portion for reflecting the return light passing through the upright window along different fields of view to the imaging reader. Advantageously. the upright window is a single pane of glass and is rearwardly tilted relative to the generally horizontal housing portion.

For further protection, at least one protection bar is exteriorly mounted on the upright window and is accommodated in the spacing. Preferably, a pair of protection bars is exteriorly mounted on the upright window in mutual parallelism in the spacing. Each protection bar resembles a decorative muntin bar, i.e., an elongated strip, preferably of plastic material, that simulates a multi-pane window. Each protection bar physically intercepts a product approaching the upright window before the product can damage the upright window. Due to the deep recess, the fields of view of the imaging readers overlap at the imaging plane and are not obstructed by the protection bars.

In accordance with another feature of this invention, the method of protecting the upright window of the bi-optical workstation during checkout of the targets bearing or associated with the indicia is performed by passing the targets past the upright window supported by the raised housing portion of the workstation, at least partly surrounding the upright window by the front wall of the raised housing portion, electro-optically reading the indicia by capturing and processing the return light returning from the indicia through the upright window, recessing the upright window in the raised housing portion, and spacing the upright window away from the front wall by a spacing exceeding one-half of an inch.

Thus, the inconvenience and the expense of cleaning, repairing and replacing the marginally recessed upright window of the known bi-optical workstation are obviated. The upright window is thus protected not only by the deep recess, but also by the protection bars, which additionally help to protect the upright window from any product approaching the upright window by at least partly physically blocking any such approach before the product can contact and thereby damage the upright window.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
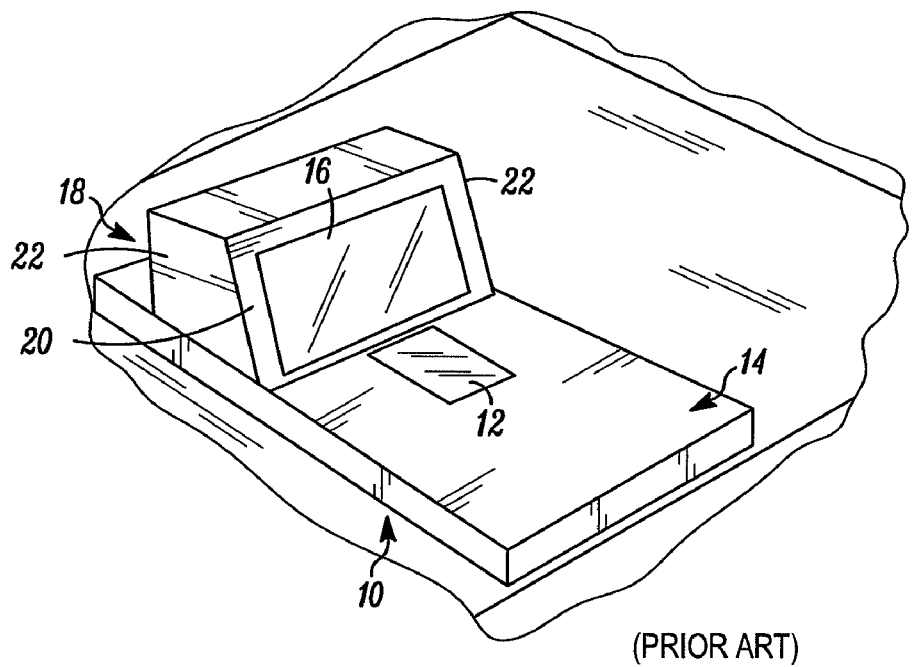
FIG. 1 is a perspective view of a dual window, bi-optical, point-of-transaction workstation for reading indicia on products in accordance with the prior art.

FIG. 1 depicts a dual window, bi-optical, point-of-transaction, imaging workstation 10 in accordance with the prior art and used, typically by retailers at a checkout stand, to process transactions involving the purchase of products or targets bearing or associated with identifying indicia, such as the UPC symbols described above. The indicia to be imaged can be symbols printed on the products, or can be symbols displayed on screens of cellular telephones, or can be symbols printed on drivers' licenses, or can be non-symbols associated with a transaction. A non-symbol can be a paper receipt, a person's likeness, or a signature, any of which might be imaged in connection with verification of a product transaction at the workstation.

Prior art workstation 10 has a generally horizontal rectangular window 12 marginally recessed in, or set flush with, a generally horizontal housing portion 14 of the workstation 10, and a vertical or generally vertical, i.e., slightly rearwardly or forwardly tilted (referred to as "upright" hereinafter) rectangular window 16 set flush with, or marginally recessed into, a generally upright or raised housing portion 18. Workstation 10 either rests directly on a countertop as illustrated, or rests in a well formed in the countertop, or may be mounted on a movable support structure, such as a turntable, for rotation in either circumferential direction about a vertical axis perpendicular to the countertop. Raised housing portion 18 has a front wall 20 lying in a plane and at least partly peripherally surrounding the upright window 16, and a pair of side walls 22, 22 at opposite lateral sides of the workstation 10.

Figure 2:
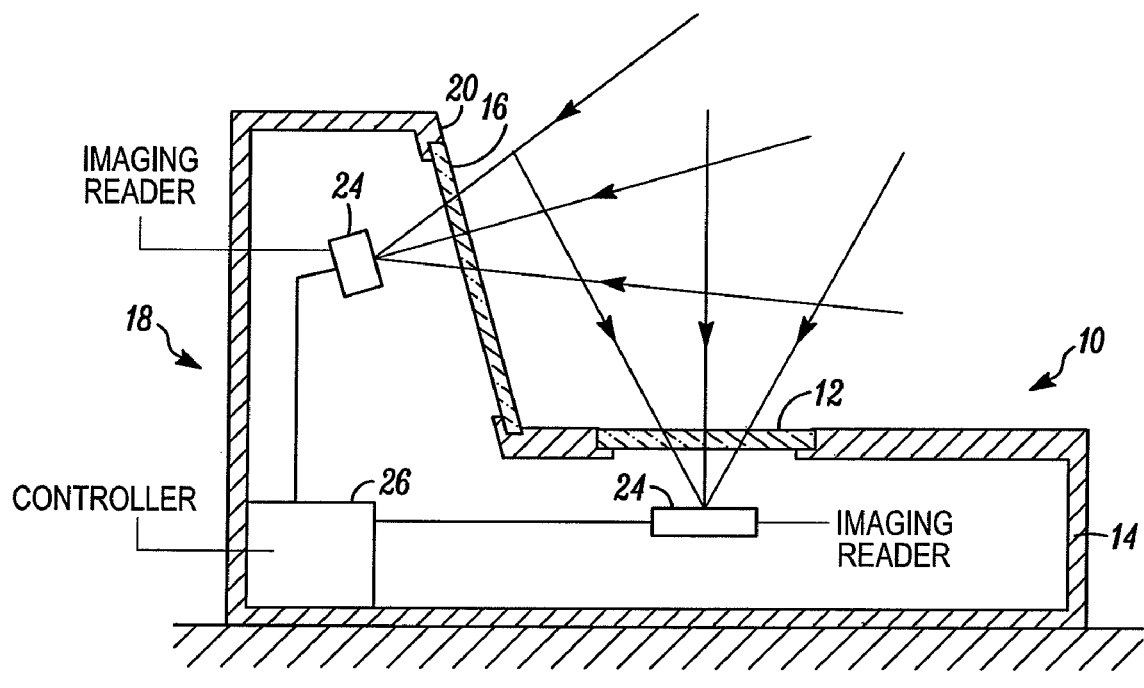
FIG. 2 is a part-sectional, part-diagrammatic, schematic view of the prior art bi-optical workstation of FIG. 1.

An electro-optical imaging reader is supported by the workstation 10 and is operative for electro-optically reading the indicia by image capture through at least one of the windows 12, 16. As schematically shown in FIG. 2, the imaging reader in the workstation 10 advantageously includes a plurality of imaging readers 24, 24, preferably at least one for each window 12, 16, for capturing return light passing through either or both windows 12, 16 over intersecting fields of view from a target that can be a one-dimensional symbol, such as a UPC symbol, or a two-dimensional symbol such as printed on a driver's license, or any document. The imaging readers 24, 24 are operatively connected to a programmed microprocessor or controller 26 operative for controlling their operation. Preferably, the controller 26 is the same as the one used for decoding the return light scattered from the target and for processing the captured target images.

In typical use, a clerk or a customer processes a product bearing a UPC symbol thereon past the windows 12, 16 by swiping the product across a respective window 12, 16, frequently with the product in contact with the respective window, or by presenting the product by holding it momentarily steady at, and against in contact with, the respective window 12, 16. The symbol may be located on any of the top, bottom, right, left, front and rear, sides of the product, and at least one, if not more, of the imaging readers 24, 24 will capture the return light reflected, scattered, or otherwise returning from the symbol through one or both windows 12, 16. A plurality of stationary field minors (not illustrated in FIG. 2) is advantageously arranged within the workstation 10 to capture the return light from the symbol through either the horizontal window 12 and/or the upright window 16 over intersecting fields of view. The captured return light is successively reflected onto the stationary field minors for reflection therefrom to at least one of the imaging readers 24.

As is well known in the art, each imaging reader 24 includes a one- or two-dimensional, solid-state imager, preferably a CCD or a CMOS array of image sensors operative, together with an imaging lens assembly, for capturing return light reflected and/or scattered from the target through the window 12, 16 during the imaging to produce an electrical signal indicative of a captured image for subsequent decoding by the controller 26 into data indicative of the symbol being read, or into a picture of the target. When each imaging reader 24 is operated in low light or dark ambient environments, an illuminator is operative for illuminating the target during the imaging with illumination light directed from an illumination light source through the window 12, 16. Thus, the return light may be derived from the illumination light and/or ambient light. The illumination light source comprises one or more light emitting diodes (LEDs).

Figure 3:
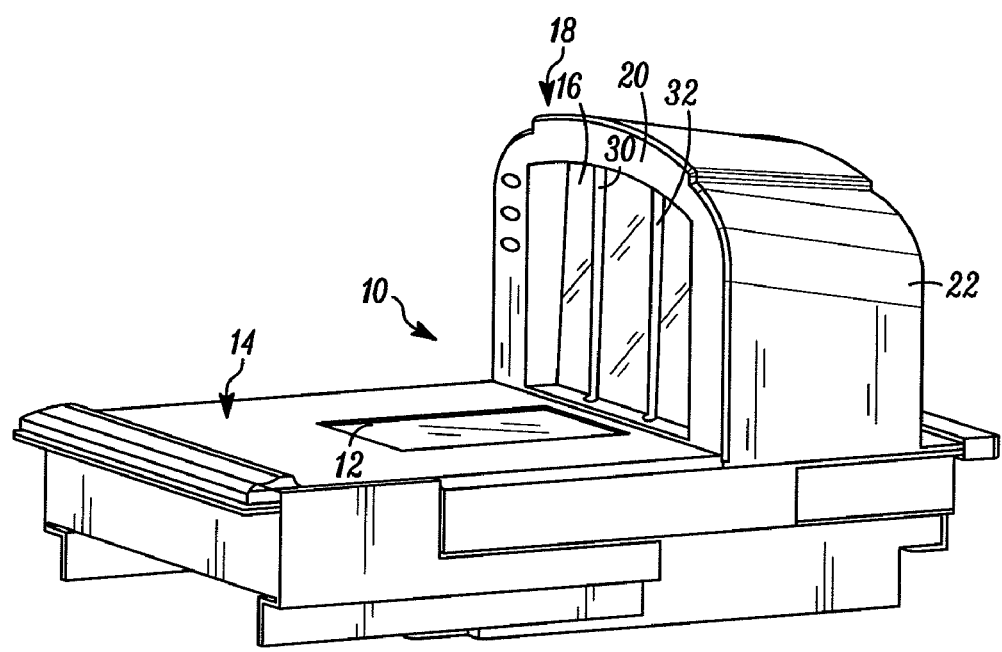
FIG. 3 is a perspective view of a bi-optical workstation with a recessed upright window and protection bars in accordance with this invention.
Figure 4:
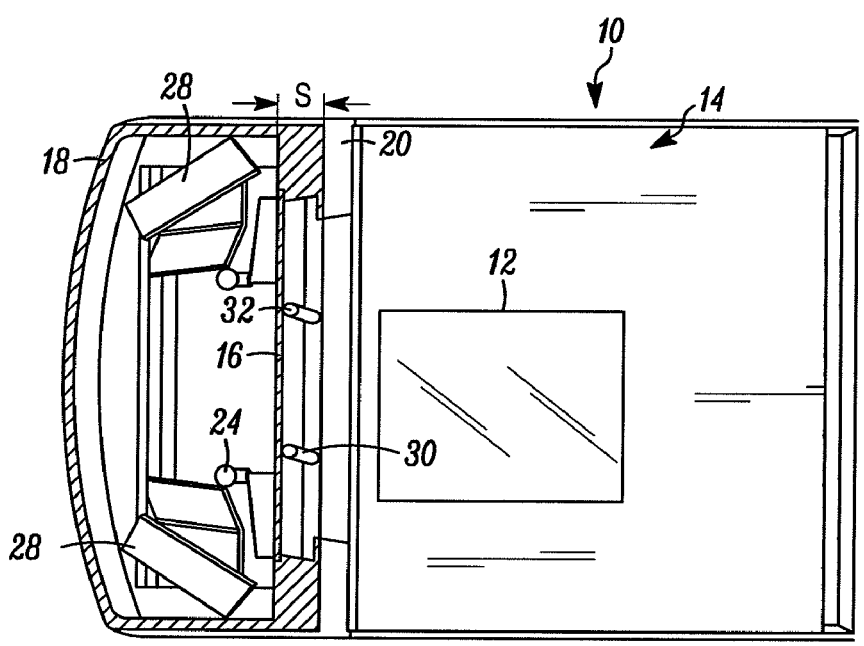
FIG. 4 is a part-sectional, top plan view of the workstation of FIG. 3.

In accordance with this invention, as best seen in FIGS. 3-4, in which like parts with that of FIGS. 1-2 have been identified with like reference numerals, the upright window 16 is protected from scratches and/or contamination, as described above, by being deeply recessed in the raised housing portion 18. The upright window 16 is spaced away from the front wall 20 by a spacing (S), as best shown in FIG. 4, exceeding one-half of an inch, and preferably on the order of one inch, and even greater than one inch. In a preferred embodiment, the upright window 16 is a single pane of light-transmissive glass and is rearwardly tilted relative to generally horizontal housing portion 18. Due to this rearward tilt, the spacing between the upright window 16 and the front wall 20 is preferably on the order of 1.2 inches at the bottom of the upright window 16, and is preferably on the order of 0.9 inches at the top of the upright window 16.

As previously noted, the front wall 20 lies in a plane, and advantageously, the imaging reader captures the return light when the indicia is located in the vicinity of this imaging plane of the front wall 20. Stationary field mirrors 28 depicted in FIG. 4 are preferably mounted deeply within the raised housing portion 18 for reflecting the return light passing through the upright window 16 from indicia at the imaging plane along different fields of view to the imaging reader.

For further protection, at least one protection bar 30, 32 is exteriorly mounted on the upright window 16 and is accommodated in the spacing. Preferably, a pair of protection bars 30, 32 is exteriorly mounted on the upright window 16 in mutual parallelism in the spacing. Each protection bar 30, 32 resembles a decorative muntin bar, i.e., an elongated strip, preferably of plastic material, that simulates a multi-pane window. Each protection bar 30, 32 physically intercepts a product approaching the upright window 16 before the product can contact and thereby damage the upright window 16. Due to the deep recess of the upright window 16, the fields of view of the imaging readers 24 overlap at the imaging plane and are not obstructed by the protection bars 30, 32.

It will be understood that each of the elements described above, or two or more together, also may find a useful application in other types of constructions differing from the types described above. For example, the upright window 16 need not be a single pane, but could be constituted of multiple panes of glass or plastic.

While the invention has been illustrated and described as embodied in protecting an upright window in a bi-optical checkout workstation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:
1. A bi-optical workstation for processing targets associated with indicia, comprising:

a housing having a generally horizontal housing portion, and a raised housing portion extending upwardly away from the horizontal housing portion, the raised housing portion having a front wall;

an imaging reader supported by the housing for electro-optically reading the indicia by capturing and processing return light from the indicia;

an upright window through which the return light passes to the imaging reader, the upright window being supported by, and recessed in, the raised housing portion, and the upright window being at least partly surrounded by the front wall and being spaced away from the front wall by a spacing exceeding one-half of an inch; and one or more protection bars exteriorly mounted on the upright window in the spacing.

2. The workstation of claim 1, and a generally horizontal window supported by the generally horizontal housing portion, and wherein the windows bound a reading zone in which the indicia are read.

3. The workstation of claim 1, wherein the upright window is spaced away from the front wall by a spacing on the order of one inch.

4. The workstation of claim 1, wherein the front wall lies in a plane, and wherein the imaging reader captures the return light when the indicia is located in the vicinity of the plane of the front wall.

5. The workstation of claim 1, wherein the upright window is rearwardly tilted relative to generally horizontal housing portion.

6. The workstation of claim 1, wherein the upright window is a single pane of glass.

7. The workstation of claim 1, and a pair of protection bars exteriorly mounted on the upright window in mutual parallelism in the spacing.

8. The workstation of claim 1, and stationary field mirrors mounted within the raised housing portion for reflecting the return light passing through the upright window along different fields of view to the imaging reader.

9. A bi-optical workstation for processing targets associated with indicia, comprising:

a housing having a generally horizontal housing portion for supporting a generally horizontal window, and a raised housing portion extending upwardly away from the horizontal housing portion, the raised housing portion having a front wall that lies in an imaging plane;

an imaging reader supported by the housing for electro-optically reading the indicia by capturing and processing return light from the indicia located in the vicinity of the imaging plane of the front wall;

an upright window through which the return light passes to the imaging reader, the upright window being supported by, and recessed in, the raised housing portion, and the upright window being at least partly surrounded by the front wall and being spaced away from the front wall by a spacing exceeding one-half of an inch; and a plurality of protection bars exteriorly mounted on the upright window and located in the spacing.

10. A method of protecting an upright window of a bi-optical workstation during checkout of targets associated with indicia, comprising the steps of:

passing the targets past the upright window supported by a raised housing portion of the workstation;

at least partly surrounding the upright window by a front wall of the raised housing portion;

electro-optically reading the indicia by capturing and processing return light returning from the indicia through the upright window;

recessing the upright window in the raised housing portion, and spacing the upright window away from the front wall by a spacing exceeding one-half of an inch; and mounting exteriorly at least one protection bar on the upright window, and locating the at least one protection bar in the spacing.

11. The method of claim 10, and supporting a generally horizontal window in a generally horizontal housing portion of the workstation.

12. The method of claim 11, and rearwardly tilting the upright window relative to generally horizontal housing portion.

13. The method of claim 10, wherein the spacing step is performed by spacing the upright window away from the front wall by a spacing on the order of one inch.

14. The method of claim 10, and configuring the front wall to lie in a plane, and wherein the reading step is performed when the indicia is located in the vicinity of the plane of the front wall.

15. The method of claim 10, and configuring the upright window as a single pane of glass.

16. The method of claim 10, and exteriorly mounting a pair of protection bars on the upright window in mutual parallelism and locating the of protection bars in the spacing.

17. The method of claim 10, and reflecting the return light passing through the upright window along different fields of view by mounting stationary field mirrors within the raised housing portion.

* * * * *

UNITED STATES PATENT AND TRADEMARK OFFICE
CERTIFICATE OF CORRECTION

PATENT NO. : 8,002,184 B1  Page 1 of 1
APPLICATION NO. : 12/855115
DATED : August 23, 2011
INVENTOR(S) : Drzymala et al.

It is certified that error appears in the above-identified patent and that said Letters Patent is hereby corrected as shown below:

In Column 2, Line 36, delete "minors" and insert -- mirrors --, therefor.

In Column 3, Line 62, delete "minors" and insert -- mirrors --, therefor.

In Column 3, Line 65, delete "Advantageously. the" and insert -- Advantageously the --, therefor.

In Column 5, Line 48, delete "minors" and insert -- mirrors --, therefor.

In Column 5, Line 53, delete "minors" and insert -- mirrors --, therefor.

In Column 8, Line 42, in Claim 16, delete "the of" and insert -- of the --, therefor.

Signed and Sealed this
First Day of January, 2013

David J. Kappos
*Director of the United States Patent and Trademark Office*